(12) United States Patent
Kalia et al.

(10) Patent No.: US 12,739,664 B2
(45) Date of Patent: Sep. 15, 2026

(54) UPDATING A DISTRIBUTED UNIT IN A 5G VIRTUAL RADIO ACCESS NETWORK

(71) Applicant: Microsoft Technology Licensing, LLC, Redmond, WA (US)

(72) Inventors: Anuj Kalia, San Francisco, CA (US); Xenofon Foukas, Cambridge (GB)

(73) Assignee: Microsoft Technology Licensing, LLC, Redmond, WA (US)

( * ) Notice: Subject to any disclaimer, the term of this patent is extended or adjusted under 35 U.S.C. 154(b) by 378 days.

(21) Appl. No.: 18/435,088

(22) Filed: Feb. 7, 2024

(65) Prior Publication Data

US 2025/0254535 A1 Aug. 7, 2025

(51) Int. Cl.
*H04W 24/02* (2009.01)
*H04L 49/00* (2022.01)

(52) U.S. Cl.
CPC ............. *H04W 24/02* (2013.01); *H04L 49/70* (2013.01)

(58) Field of Classification Search
CPC ......... H04W 28/0231; H04W 28/0284; H04W 48/12; H04W 76/10; H04W 84/042; H04W 88/085
See application file for complete search history.

(56) References Cited

U.S. PATENT DOCUMENTS 11,937,103 B1 * 3/2024 Krasilnikov ........ H04L 41/0895
12,236,248 B1 * 2/2025 Gupta ..................... G06F 9/445
12,432,606 B1 * 9/2025 Krasilnikov ........ H04W 88/085
2015/0143354 A1 * 5/2015 Mathew .................. G06F 8/656 717/170
2024/0223410 A1 * 7/2024 Nakazato .............. H04W 24/04
2025/0254563 A1 * 8/2025 Bagasrawala ....... H04W 28/084
2025/0254566 A1 * 8/2025 Ushakoyala ........ H04L 41/0813
2025/0323697 A1 * 10/2025 Tang .................... H04B 7/0617

* cited by examiner

*Primary Examiner* — Awet Haile
(74) *Attorney, Agent, or Firm* — ArentFox Schiff LLP

(57) ABSTRACT

A distributed unit (DU) in a virtual radio access network (vRAN) of a wireless 5G (fifth generation) network is implemented using software-defined networking (SDN) technology on a single computer server that is physically co-located with a radio unit in a distributed RAN (D-RAN) architecture. An update agent facilitates versioning support through interoperations with different DU versions, v1 and v2, to prevent them from concurrently executing real-time processing threads on the server's processor which would cause malfunctions. DU v2 is initialized using non-real-time threads. The update agent blocks real-time processing thread generation by DU v2 after initialization is complete. The update agent sets DU v1 processing threads to non-real-time and unblocks DU v2 to migrate data traffic between the versions. A layer 2 switch provides duplicated data packets to virtual network interface cards that are implemented for the respective DU versions and which share a common MAC (medium access control) address.

20 Claims, 15 Drawing Sheets

5G network
100

UE
(105)
Air interface
(110)
Radio Unit (RU)
(115)
Fronthaul
120
Distributed Unit (DU)
(125)
Midhaul
135
Central Unit (CU)
(130)
Backhaul
150
Core Network (CN)
(145)
Virtual radio access network (vRAN)
(140)

100
RU
RF
205
Low PHY
210
115
Fronthaul
120
DU
RLC
225
MAC
220
High PHY
215
125
F1
230
CU
RRC
240
PDCP
235
CU-CP
245
E1
255
CU-UP
250
130
E2
265
Real-time RAN intelligent controller (near RT-RIC)
260
A1
270
CN
Non-real-time RAN intelligent controller (non-RT-RIC)
275
145
Virtual radio access network (vRAN)
(140)

300

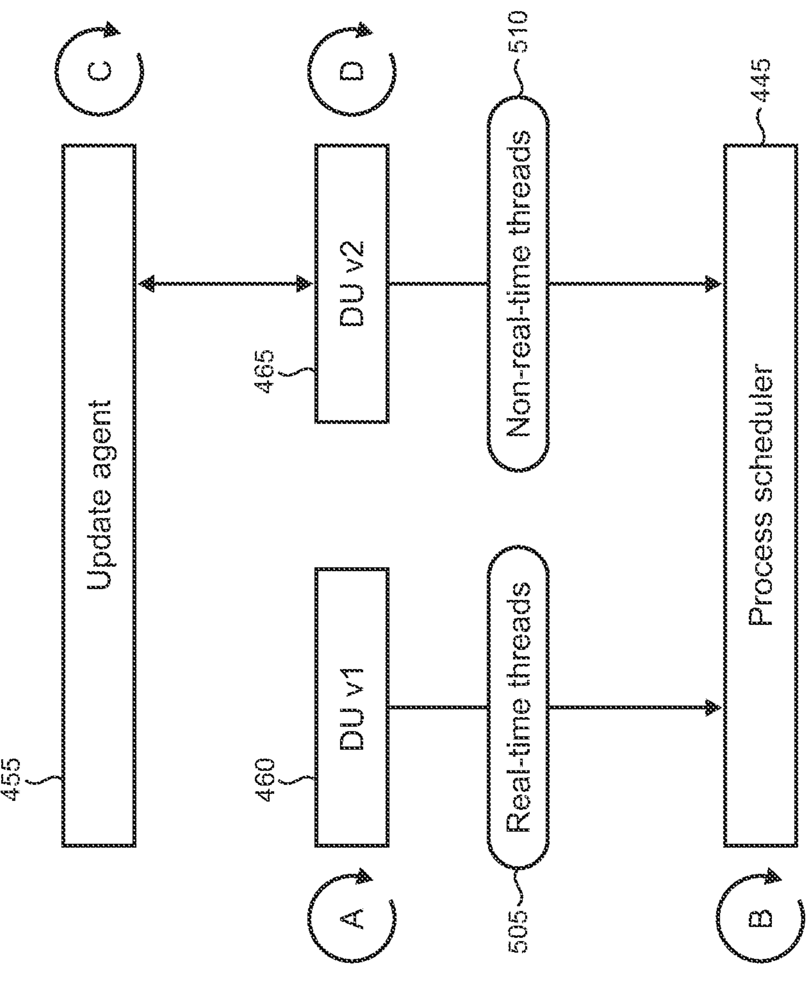
Stage 1:
A) DU v1 generates real-time threads for UE traffic
B) Process scheduler gives priority to real-time threads
C) Update agent monitors DU v2 thread generation
D) DU v2 initializes by generating non-real-time threads Stage 2:

E) DU v2 completes initilization and attempts to start real-time threads

F) Update agent uses real-time thread start attempt as implicit signal that DU v2 initialization is completed and responsively intercepts creation and/or priority change events at DU v2

G) Update agent blocks DU v2 from generating real-time threads

Stage 3:

H) Update agent sets DU v1 threads to non-real-time priority

I) DU v1 generates non-real-time threads

J) Update agent unblocks DU v2 from generating real-time threads

K) DU v2 generates real-time threads for UE traffic

L) Process scheduler gives priority to real-time threads from DU v2 to starve DU v1 processing threads Server
305
User space
450
DU v1
DPDK
PMD
460
820
830
DU v2
DPDK
PMD
465
825
835
OS kernel
440
Data
805
Data
805
vNIC 1
810
vNIC 2
815
Common MAC address
814
Network interface card (NIC)
430
Embedded layer 2 switch
840
Data
805
Fronthaul
120
RU
115

Figure 10:
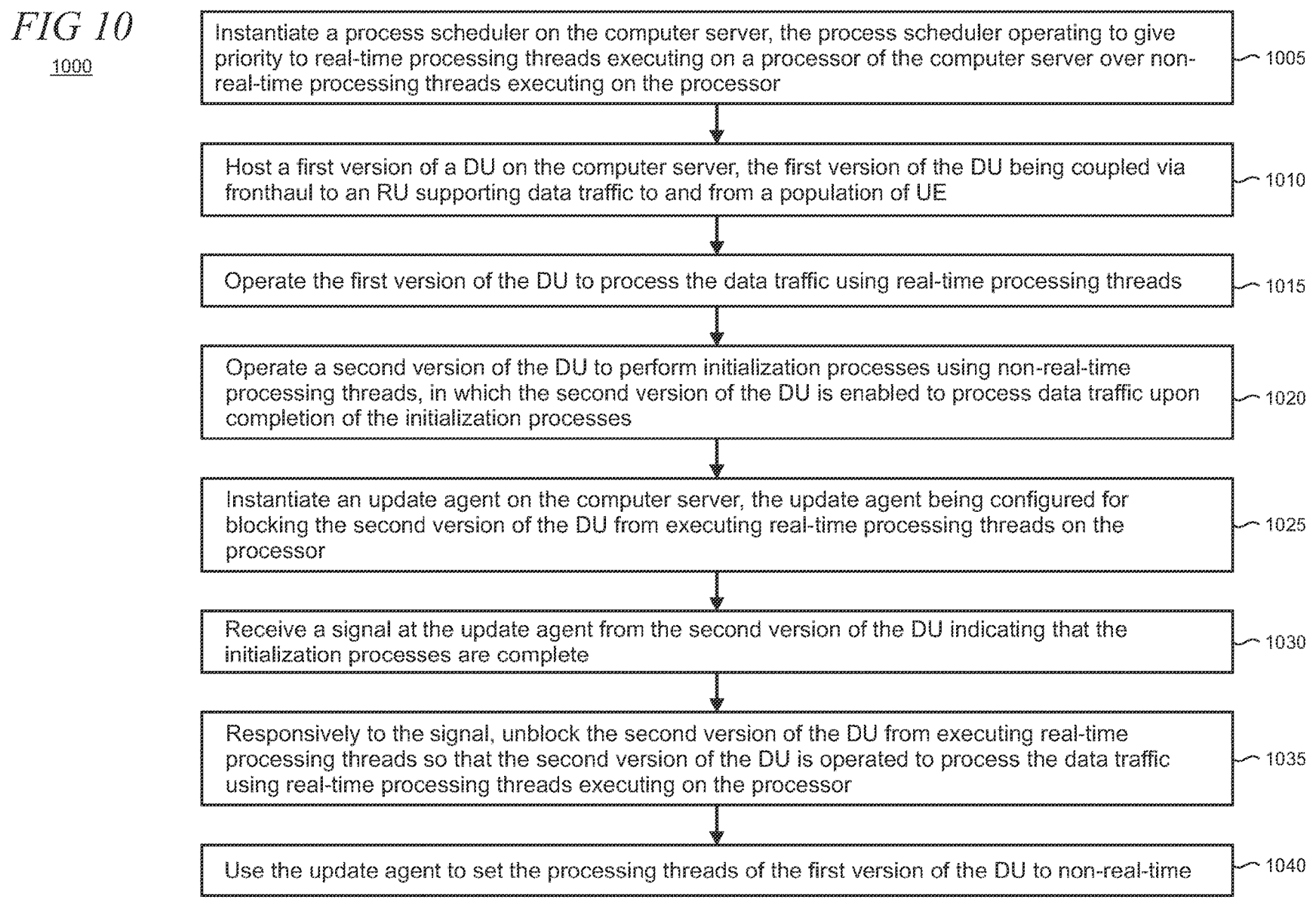

1005: Instantiate a process scheduler on the computer server, the process scheduler operating to give priority to real-time processing threads executing on a processor of the computer server over non-real-time processing threads executing on the processor 1010: Host a first version of a DU on the computer server, the first version of the DU being coupled via fronthaul to an RU supporting data traffic to and from a population of UE 1015: Operate the first version of the DU to process the data traffic using real-time processing threads 1020: Operate a second version of the DU to perform initialization processes using non-real-time processing threads, in which the second version of the DU is enabled to process data traffic upon completion of the initialization processes 1025: Instantiate an update agent on the computer server, the update agent being configured for blocking the second version of the DU from executing real-time processing threads on the processor 1030: Receive a signal at the update agent from the second version of the DU indicating that the initialization processes are complete 1035: Responsively to the signal, unblock the second version of the DU from executing real-time processing threads so that the second version of the DU is operated to process the data traffic using real-time processing threads executing on the processor 1040: Use the update agent to set the processing threads of the first version of the DU to non-real-time

1200

105

1400
Core network (145)
1405
UDR
1440
NRF
1425
PCF
1435
UDM
1430
AUSF
1485
S11-IWF
1480
MME
1415
AMF
1420
SMF
1410
UPF
1475
1470
AF
1465
DN
Mobile network or enterprise operator
1404
4G RAN
1406
5G RAN
4G UE
1401
5G UE
1401
5G core and SBA NFs
4G interworking NFs
Shared 4G/5G components 1500
App
VM OS1
VM OS2
VM OSN
VM1
VM2
VMN
Host OS
Host Processor(s)
Memory
Storage
1512
Connector I/O
Server/Blade 1
Server/Blade N
1501_1
1501_N
1506
1507
1508
1509
1510
1511
1513
Health Monitoring
1516
Access control svc.
1517
Directory and ID management svc
1518
Load Balancer
1503
Datacenter Management Controller
1502
Routers/ Switches
1504
DNS Log
1515
DNS Server
1514
Internet / LAN
1505

UPDATING A DISTRIBUTED UNIT IN A 5G VIRTUAL RADIO ACCESS NETWORK

BACKGROUND

Wireless 5G (fifth generation) networks offer the ability to connect tens of billions of intelligent devices, densely deployed and generating orders of magnitude more data to be handled by the network. Consumers' expectations for 5G networks are high and mobile network operators will be under real pressure from enterprise customers to move quickly, delivering 5G's low latency, dense device, and high-performance capabilities to enable near-real-time management and control of critical business operations.

SUMMARY

A distributed unit (DU) in a virtual radio access network (vRAN) of a wireless 5G (fifth generation) network is implemented using software-defined networking (SDN) technology on a single computer server that is physically co-located with a radio unit (RU) in a distributed RAN (D-RAN) architecture. RF (radio frequency) and baseband processing at an RU site is performed locally by the DU while the remaining processing for higher protocol layers is performed by a remotely-located centralized unit (CU). The D-RAN 5G network architecture shortens the fronthaul between the RU and DU and minimizes the computing resource footprint at the radio site. However, a single server architecture would conventionally complicate software versioning support for the DU. Malfunctions can occur when both an existing and an updated DU version attempt to simultaneously execute threads on the same processor of the server when an updated DU version is started up and data traffic is migrated from the existing and updated DU versions.

The present principles provide for instantiating an original first DU version, v1, and an updated second version, v2, on the same server. DU v1 processes fronthaul data packets using real-time processing threads which are given priority over non-real-time processing threads by a process scheduler running on the server. DU v2 is initialized using non-real-time processing threads having lower priority which do not cause scheduling deadline conflicts with the real-time processing threads of DU v1. When DU v2 completes initialization and is ready to handle fronthaul data traffic, an update agent running on the server blocks real-time processing thread creation by DU v2 to prevent conflicts with DU v1 that would otherwise result from attempted concurrent real-time thread execution from two applications on the same processor. The update agent then switches the processing threads created by DU v1 to low-priority non-real-time while unblocking real-time processing thread creation by DU v2. These actions enable data traffic migration from DU v1 to DU v2 with minimal disruption because the real-time threads of DU v2 for data traffic processing are given priority by the scheduler over the non-real-time threads such that the DU v1 processing becomes starved.

Duplicated data packets for fronthaul traffic are provided to each of the DUs v1 and v2 by creating two virtual network interface cards (vNICs) on the computer server that share a common MAC (medium access control) address in which a separate vNIC is dedicated to each DU version. A layer 2 (i.e., Ethernet) switch, which may be embedded in a physical NIC in the server, provides duplicated data packets to each vNIC and respective DU version. The dedication of a vNIC to each DU version enables kernel-bypass data packet processing, such as DPDK (data plane development kit), which can be faster and/or more efficient than conventional interrupt-based processing using an operating system (OS) kernel, by routing the data packets around the kernel and reducing processor cycles for sending and receiving packets and associated overhead.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. Furthermore, the claimed subject matter is not limited to implementations that solve any or all disadvantages noted in any part of this disclosure. It will be appreciated that the above-described subject matter may be implemented as a computer-controlled apparatus, a computer process, a computing system, or as an article of manufacture such as one or more computer-readable storage media. These and various other features will be apparent from a reading of the following Detailed Description and a review of the associated drawings.

DESCRIPTION OF THE DRAWINGS

FIGS. 5-7 show stages of an illustrative process for updating a DU in a DRAN use case that employs a single computer server;

FIGS. 9-11 show illustrative methods that are performed to implement one or more of the present principles for updating a 5G DU;

Like reference numerals indicate like elements in the drawings. Elements are not drawn to scale unless otherwise indicated.

DETAILED DESCRIPTION

Figure 1:
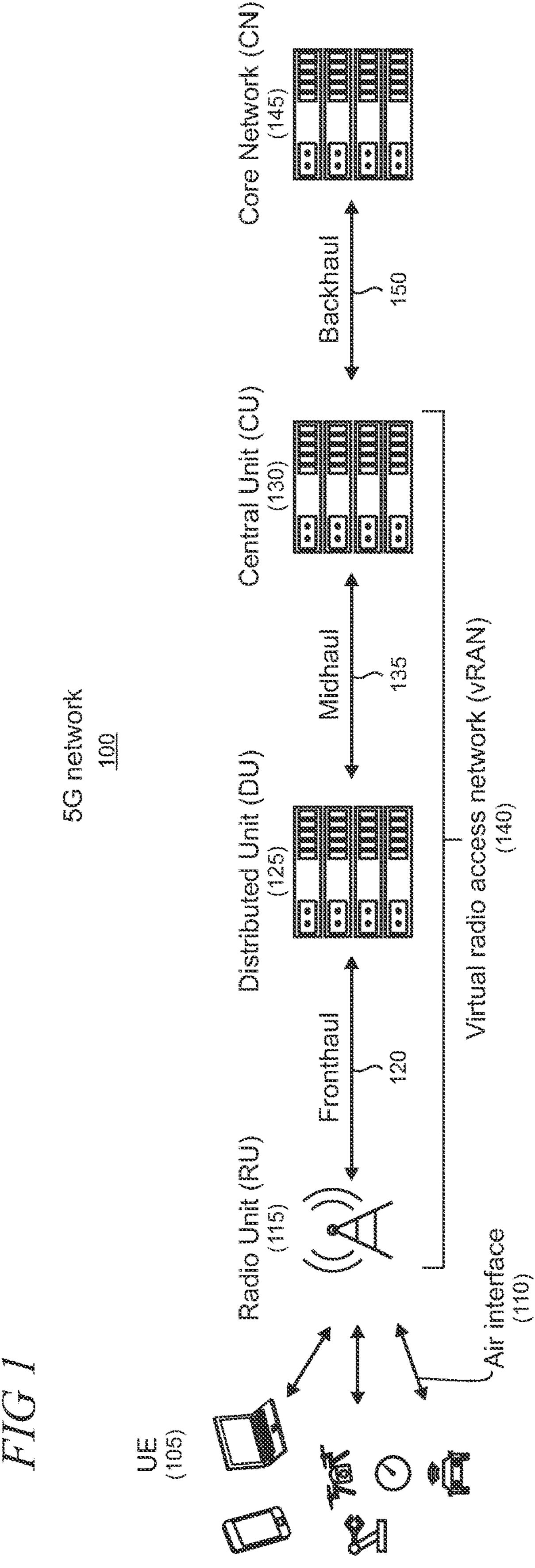
FIG. 1 shows an illustrative architecture for a 5G (fifth generation) network.

FIG. 1 shows an illustrative architecture for a 5G (fifth generation) network 100. User equipment (UE) 105, comprising computing devices, such as phones, tablets, personal computers, laptops, and Internet-of-Things (IoT) devices, communicate wirelessly over an air interface 110 with a radio unit (RU) 115. The RU delivers data traffic to and from the UE over a fronthaul 120 to a distributed unit (DU) 125 that is connected to a centralized unit (CU) 130 by a midhaul 135. The combination of RU, DU, and CU is referred to as a radio access network (RAN). A virtualized version of a RAN is referred to as a vRAN 140. The CU is connected to a core network (CN) 145 via a backhaul 150.

Figure 2:
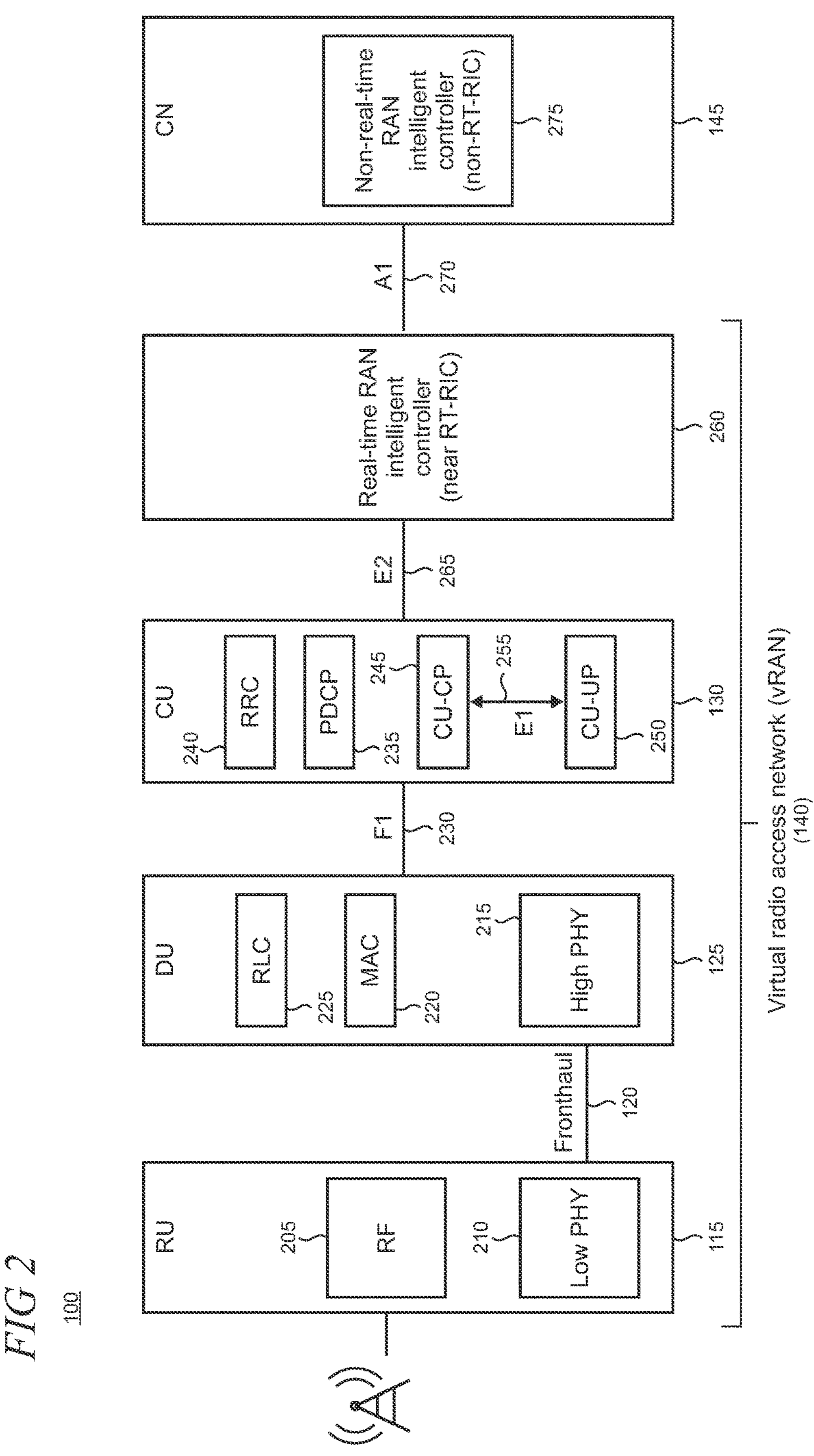
FIG. 2 shows an illustrative split of functionalities in a 5G network.

The O-RAN (Open RAN) Alliance describes a modular SDN (software-defined networking) RAN architecture that provides for open interface specification for fronthaul, midhaul, and backhaul and describes concepts for splitting functionalities across the RAN components. FIG. 2 shows an illustrative split of functionalities in the 5G network 100 in which the DU 125 is responsible for real-time layers 1 and 2 (L1 and L2) scheduling functions, and the CU 130 is responsible for non-real-time, higher L2 and L3 functions. It is emphasized that the particular configuration of functionalities shown in FIG. 2 and described in the accompanying text is intended to be illustrative and not limiting. Variations in the configuration may be implemented to meet the needs of a particular application of the present principles.

The RU 115 provides radio hardware to convert RF (radio frequency) signals to and from an antenna into a digital signal for transmission over packet-based networks. The RU includes an RF (radio frequency) transmitter 205 and a low PHY (physical) block 210 comprising the lower portion of a PHY layer in the OSI (open system interconnection) model) that is split according to option 7.2 in the O-RAN architecture. The PHY layer is responsible for coding and modulation. The PHY block typically comprises, for example, an FPGA (field programmable gate array) or ASIC (application-specific integrated circuit) that is optimized for radio data packet handling at wireline speeds with low latency.

The low PHY block 210 in the RU 115 is coupled over the fronthaul 120 to a high PHY block 215 in the DU 125. The DU provides radio data packet handling to and from the fronthaul and includes a MAC (medium access control) function 220 as defined by 3GPP Technical Specification 38.321. It operates above the PHY layer and below an RLC (radio link control) layer 225. The MAC function controls access of the UE to the shared radio resources, schedules transmissions, and manages various services and functions within the 5G network 100. The MAC function is responsible for buffering, multiplexing, and demultiplexing segments, including all real-time scheduling decisions about which segments are transmitted when. It is also able to make a "late" forwarding decision (i.e., to alternative carrier frequencies, including Wi-Fi, for example). The MAC function interacts with the RLC and PDCP (packet data convergence protocol functions (described below) to ensure end-to-end data delivery and protocol convergence.

The DU 125 is connected to the CU 130 over an F1 midhaul interface 230 described by O-RAN. The CU is configured with a PDCP function 235 and RRC (Radio Resource Control) function 240. The PDCP function is responsible for compressing and decompressing IP (Internet protocol) headers, ciphering and integrity protection, and making an "early" forwarding decision (i.e., whether to send the packet down the pipeline to the UE or forward it to another base station). The RRC function is responsible for configuring the coarse-grain and policy-related aspects of the RAN processing pipeline. The RRC function interfaces with a control plane (CP) function 245 while the PDCP function interfaces with a user plane (UP) function 250.

The CP and UP functions 245 and 250 are connected over an E1 interface 255. The separation of control and user planes optimizes network efficiency and resource allocation. The UP function, responsible for transmitting user data, maximizes throughput and efficiency through the packet data convergence protocol. The CP function, which transfers control information, maintains robust network signaling and security.

A near real-time RAN intelligent controller (near RT-RIC) 260 sits upstream in the vRAN 140 from the CU 130 and is coupled via an E2 interface 265. The RIC virtualizes the vRAN into a series of functions accessible by upstream core controllers in the CN 145. An A1 interface 270 interconnects a non-real-time RIC (non-RT-RIC) 275 function in a service management and orchestration (SMO) layer (not shown) with the near RT-RIC in the vRAN. The A1 interface allows for the non-RT-RIC to provide policy guidance to the vRAN to control its operations. Goals of the policies include, for example, non-real-time radio resource management, higher layer procedure optimization, policy optimization in the vRAN, and providing guidance, parameters, policies, and various models (e.g., artificial intelligence and/or machine learning models) to support the operation of the near RT-RIC in the vRAN.

Figure 3:
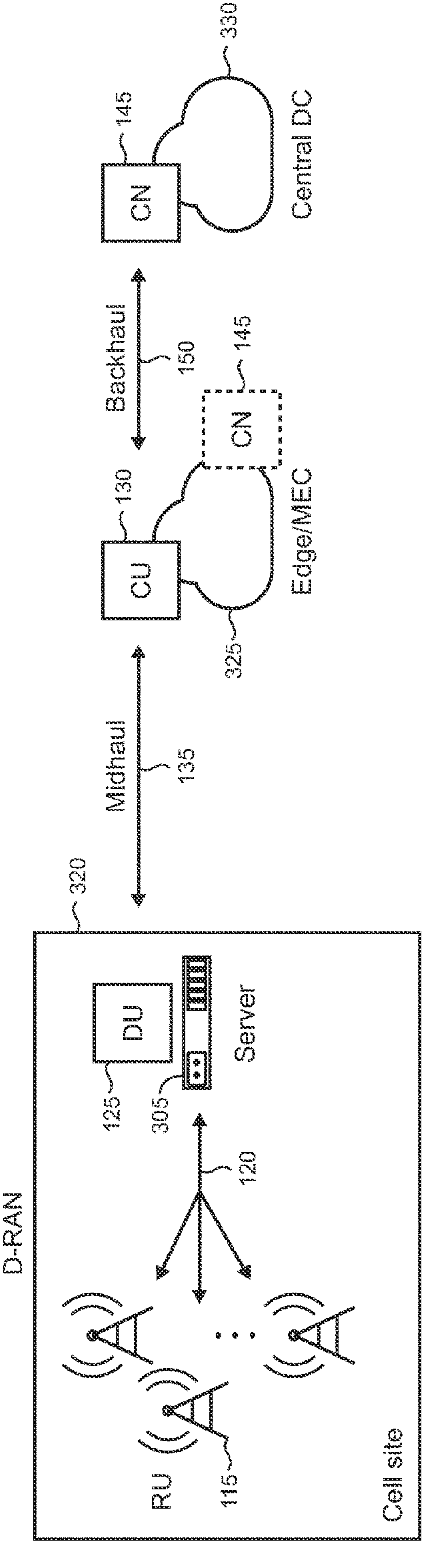
FIG. 3 shows an illustrative distributed radio access network (D-RAN) architecture.

FIG. 3 shows an illustrative distributed radio access network (D-RAN) architecture 300 in which a DU 125 is hosted on a computer server 305. The combination of DU and server is physically co-located with one or more RUs 115. For example, the D-RAN may be implemented at a cell site 320 where the DU and server are implemented as part of the RU antenna infrastructure. In typical D-RAN use cases, around three to ten radios are supported by the DU.

In common deployments of D-RAN architectures, a single computer server is typically utilized at the cell site 320 to keep the computing resource footprint compact which can advantageously lower capital and operating costs for network operators. In addition, small computing footprints facilitate D-RAN infrastructure to be utilized in network deployments that distribute many small cell sites, or micro-cells, to provide targeted and/or fine-grained wireless network coverage and capacity in areas where it may not be feasible or cost-effective to use traditional RAN architectures that employ more centralized computing infrastructure.

In this illustrative example, the CU 130 is remotely located from the DU 125 hosted by the single computer server 305 at the cell site 320. For example, the CU is located in an edge cloud 325 that situates cloud-based computing resources closer to where data is generated and end-users and UE are located relative to traditional cloud computing. The edge cloud is configurable as a multi-access edge computing (MEC) network in some applications, or the edge cloud may include MEC functions and features. The CN 145 is located at a central cloud computing datacenter (DC) 330 in this illustrative example. However, in alternative deployment scenarios, the CN may be co-located with the CU in the edge cloud as indicated by the dashed rectangle in the drawing.

Figure 4:
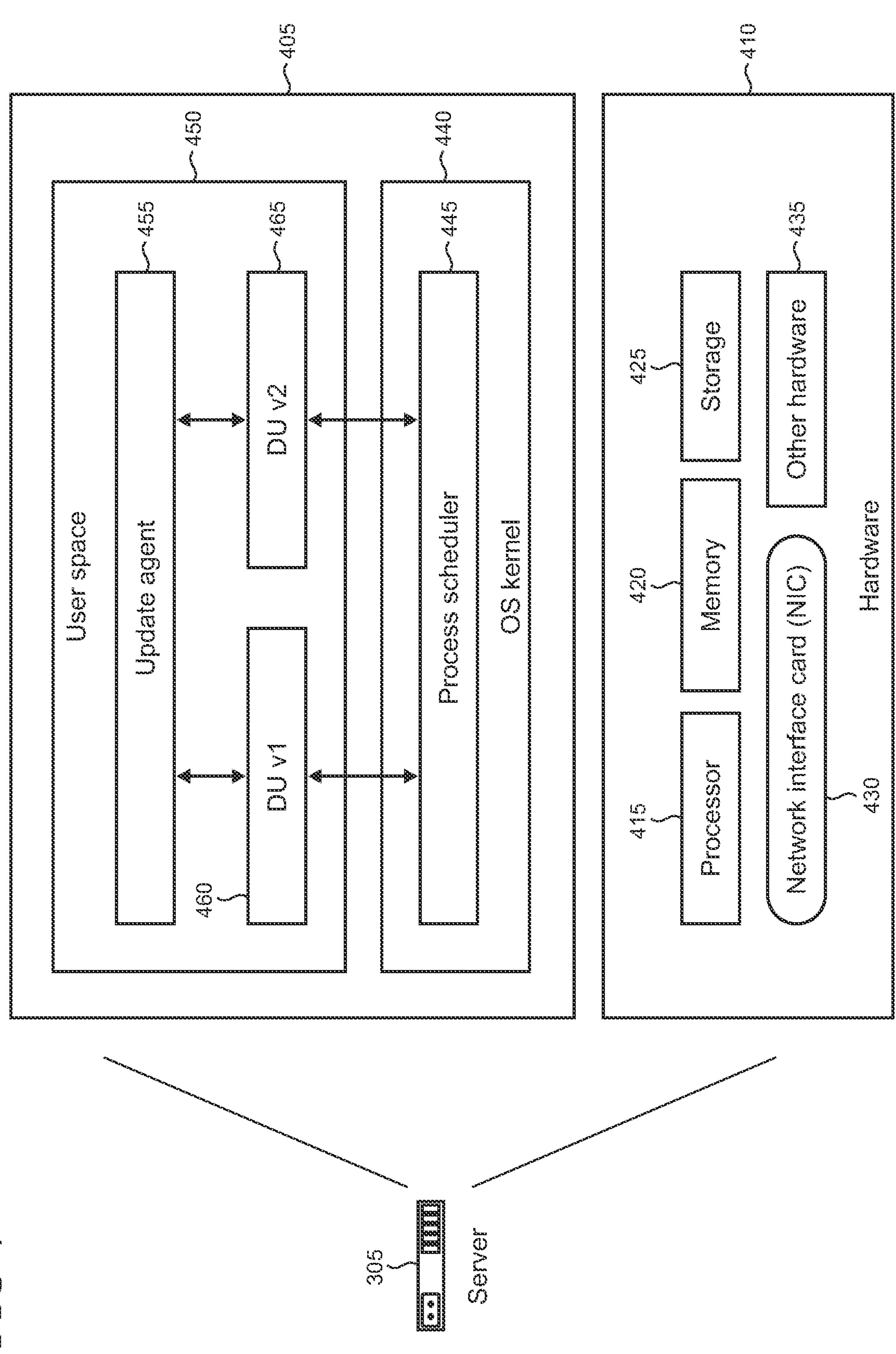
FIG. 4 shows illustrative software and hardware components instantiated on a server supporting a 5G distributed unit (DU)

FIG. 4 shows illustrative software 405 and hardware components 410 instantiated on the computer server 305. The hardware includes a processor 415, memory 420, storage 425, a network interface card (NIC) 430, and various other hardware, collectively indicated by reference numeral 435. It is noted that the hardware shown and described herein is illustrative and not limiting and that the present principles are applicable to different hardware configurations for the server. It is further noted that the processor may be a multi-core processor and therefore the term "processor" as used herein is applicable to an entire microprocessor on a single integrated circuit and/or to one or more separate processing cores of the processor. The present principles for software versioning support for vRANs are generally applicable to data packet processing by a DU whether single- or multi-threaded.

Figure 6:
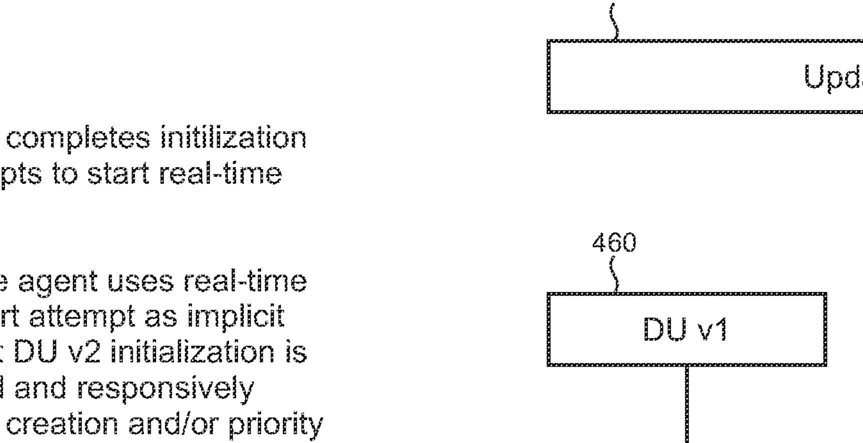
Figure 7:
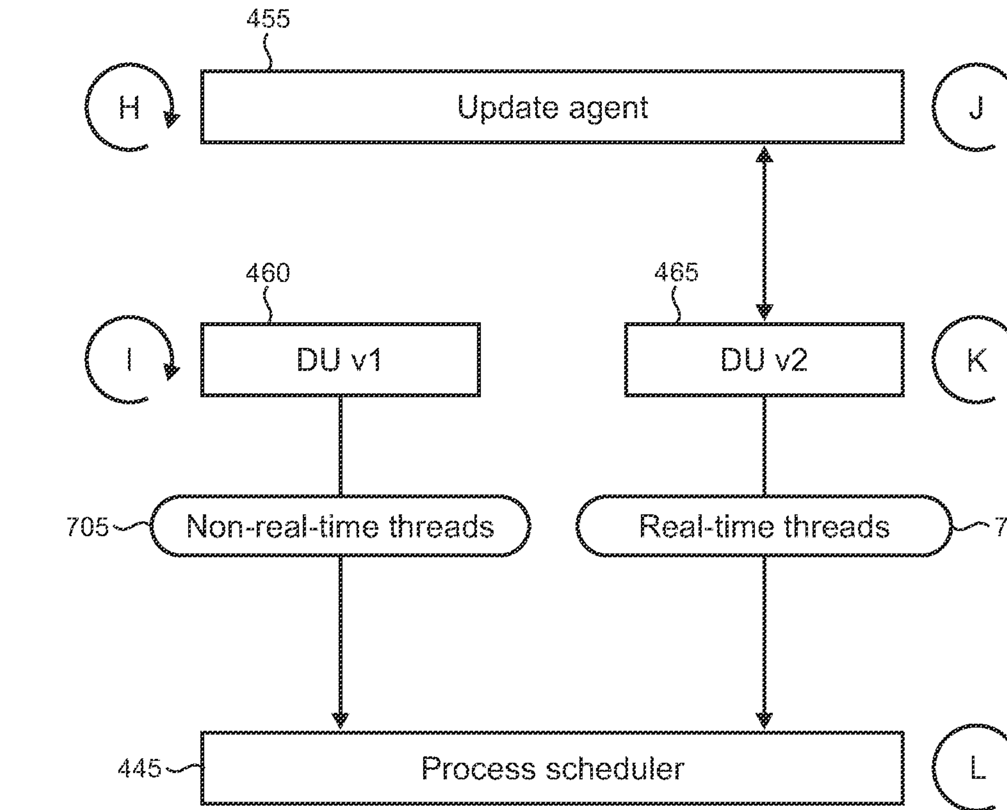

The software 405 includes an OS kernel 440 that supports a process scheduler 445. User space applications 450 in this illustrative example include an update agent 455 and two DU applications—an older/existing version of the DU, DU v1 460, and an updated version of the DU, DU v2 465. The process for updating the DU by starting up DU v2, migrating fronthaul data traffic from DU v1 to DU v2, and then shutting down DU v1 is described below using a series of stages, as shown in FIGS. 5-7. It is noted that the various processes shown in the drawings are not necessarily performed sequentially, thus an order of operations is not necessarily implied by the order in which the processes are described.

In a first stage shown in FIG. 5, DU v1 460 handles fronthaul data packets by generating real-time processing threads 505, as indicated by process A. The process scheduler 445 is configured to give priority to real-time processing threads over non-real-time processing threads, in process B. In process C, the update agent 455 is arranged to monitor processing threads generated by DU v2 465. For example, the update agent can monitor events occurring on DU v2 relating to thread creation or changes to thread priority. To implement software versioning support for the DU, when an update is ready to be installed, the DU v2 is first initialized. DU v2 performs initialization by generating non-real-time processing threads 510, in process D. The update scheduler prevents these low priority processing threads from interfering with the high-priority processing threads of DU v1 for fronthaul data traffic.

In the second stage of the DU updating process shown in FIG. 6, DU v2 465 will typically attempt to start real-time processing threads 605 once its initialization is completed, in process E. However, in process F, the update agent 455 monitors the attempted start and uses it as an implicit signal from DU v2 that initialization is completed. In alternative implementations, DU v2 is configured to provide an explicit signal to the update agent when it completes initialization and is ready to start handling fronthaul data traffic. In response to the signal (whether implicit or explicit), the update agent intercepts thread creation and/or priority change events at DU v2 in process F, and blocks real-time processing thread creation in process G. As processes E, F, and G are implemented, DU v1 continues to create real-time processing threads 505 to handle fronthaul data traffic.

In the third stage of the DU updating process shown in FIG. 7, the update agent 455 sets the processing threads of DU v1 460 to non-real-time in process H. In response, in process I, DU v1 generates non-real-time processing threads 705. In process J, the update agent unblocks DU v2 from generating real-time processing threads. DU v2 generates real-time processing threads 710 to thereby handle fronthaul data traffic in process K. The process scheduler gives priority to real-time processing threads from DU v2, in process L, which starves DU v1 of processing resources, which effectively shuts it down. The migration of data traffic from DU v1 to DU v2 may be expected to be implemented quickly, typically in less than a second, so that minimal disruption to the data traffic is experienced. It may be appreciated that this level of disruption is approximately equal to that commonly experienced during handovers of data traffic when mobile UEs move across cell sites and is thus expected to be satisfactory in many applications.

For data traffic to be migrated between DU v1 and DU v2, fronthaul data packets need to be available at DU v2 once the DU has completed initialization and is ready to handle traffic in accordance with the processes described above. This data availability is implemented using duplicated data packets that are simultaneously provided to both DU v1 and DU v2 to ensure effective migration.

Figure 8:
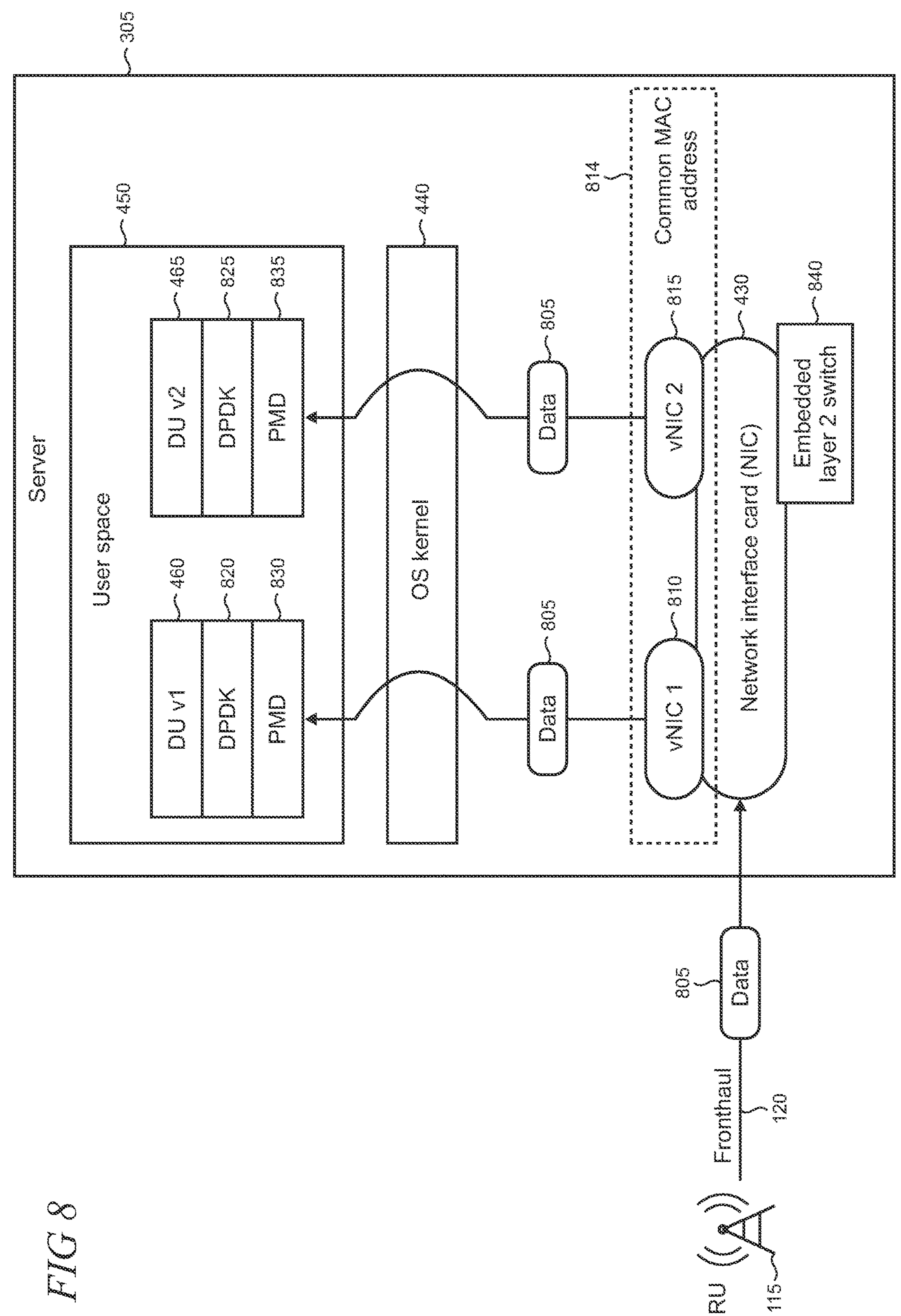
FIG. 8 shows illustrative duplication of fronthaul data packets to enable simultaneous delivery to different versions of a DU.

FIG. 8 shows an illustrative arrangement for duplicating fronthaul data packets (representatively indicated by reference numeral 805) that are concurrently delivered to DU v1 and DU v2. As shown, two discrete virtual network interface cards (vNICs) 810 and 815 are instantiated on the computer server 305. The vNICs share a common MAC address, as indicated by reference numeral 814, and are each configured to provide substantially similar features and functionalities as the physical NIC 430 in the server.

Each vNIC 810 and 815 is dedicated to a respective DU version. Thus, each DU application in the user space 450 owns its own vNIC. This arrangement facilitates a data processing technique that bypasses the OS kernel 440 to enable the applications to interface directly with the network interfaces to avoid overhead associated with switching context and copying data between the kernel and applications, among other advantages. In high throughput low latency environments such as 5G, kernel-bypass data processing can provide significant benefits in data processing performance.

Kernel-bypass processing is implemented in this illustrative example using DPDK (data plane development kit) libraries 820 and 825 and poll mode driver (PMD) APIs (application programming interfaces) 830 and 835 that are associated with respective versions of the DU, DU v1 460 and DU v2 465, in the user space 450, as shown. Using DPDK processes, the PMD APIs enable DU v1 and DU v2 to continuously poll their dedicated vNICs for data packets to thereby avoid the processing overhead associated with conventional interrupts. The vNICs use DMA (direct memory access) to place the data packets directly into the address spaces of the DU versions.

When the data packets 805 are received at the physical NIC 430, a layer 2 switch 840 (e.g., an Ethernet switch) duplicates the data packets to each of the vNICs 810 and 815 and respective DUs v1 and v2. The layer 2 switch may be embedded into the physical NIC in some cases.

Figure 9:
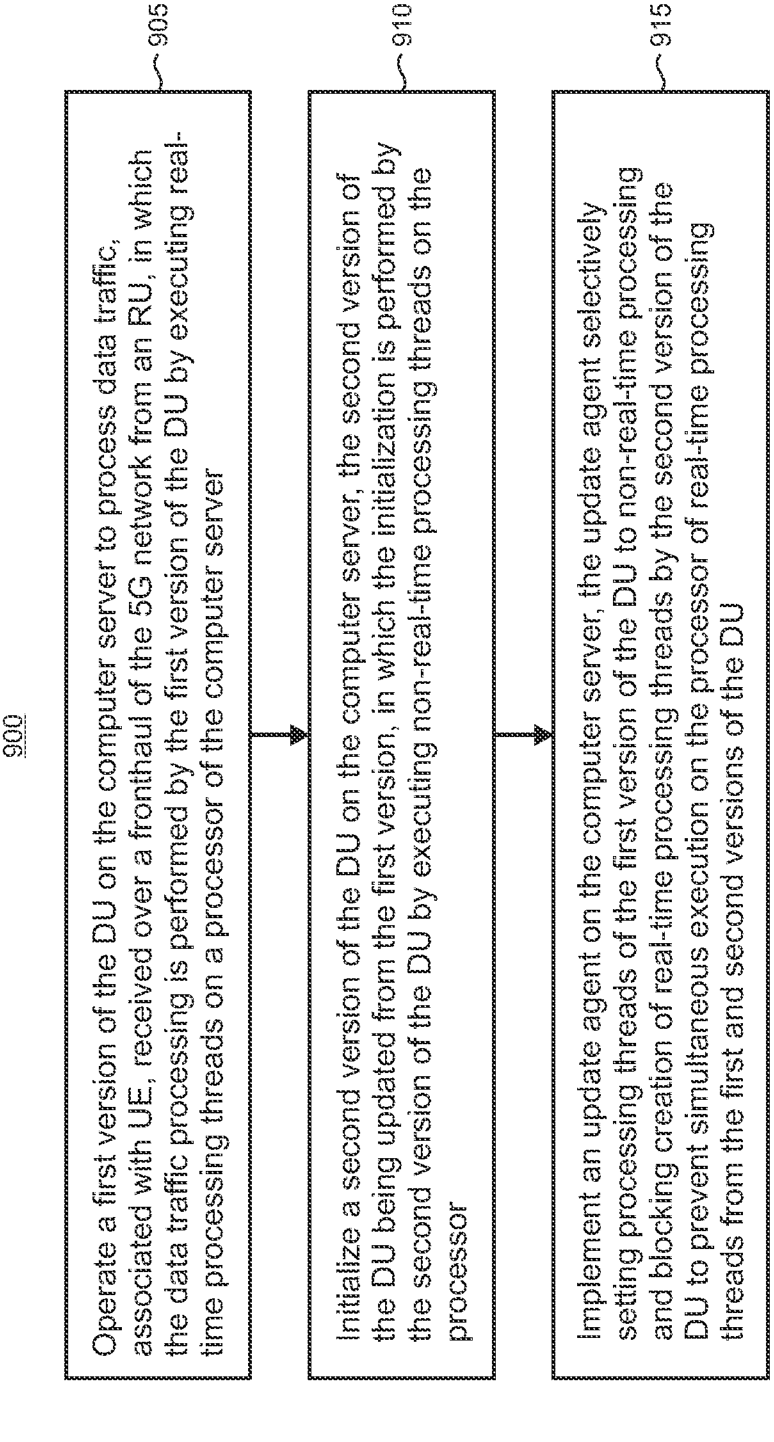

FIG. 9 shows an illustrative method 900 for updating versions of a DU in a vRAN of a wireless 5G network. Unless specifically stated, methods or steps shown in the flowchart blocks and described in the accompanying text are not constrained to a particular order or sequence. In addition, some of the methods or steps thereof can occur or be performed concurrently and not all the methods or steps have to be performed in a given implementation depending on the requirements of such implementation and some methods or steps may be optionally utilized.

Block 905 includes operating a first version of the DU on the computer server to process data traffic, associated with UE, received over a fronthaul of the 5G network from an RU, in which the data traffic processing is performed by the first version of the DU by executing real-time processing threads on a processor of the computer server. Block 910 includes initializing a second version of the DU on the computer server, the second version of the DU being updated from the first version, in which the initialization is performed by the second version of the DU by executing non-real-time processing threads on the processor. Block 915 includes implementing an update agent on the computer server, the update agent selectively setting processing threads of the first version of the DU to non-real-time processing and blocking creation of real-time processing threads by the second version of the DU to prevent simultaneous execution on the processor of real-time processing threads from the first and second versions of the DU.

FIG. 10 shows an illustrative method 1000 performable by a computer server to update a version of a DU. Block 1005 includes instantiating a process scheduler on the computer server, the process scheduler operating to give priority to real-time processing threads executing on a processor of the computer server over non-real-time processing threads executing on the processor. Block 1010 includes hosting a first version of a DU on the computer server, the first version of the DU being coupled via fronthaul to an RU supporting data traffic to and from a population of UE.

Block 1015 includes operating the first version of the DU to process the data traffic using real-time processing threads. Block 1020 includes operating a second version of the DU to perform initialization processes using non-real-time processing threads, in which the second version of the DU is enabled to process data traffic upon completion of the initialization processes. Block 1025 includes instantiating an update agent on the computer server, the update agent being configured for blocking the second version of the DU from executing real-time processing threads on the processor.

Block 1030 includes receiving a signal at the update agent from the second version of the DU indicating that the initialization processes are complete. Block 1035 includes, responsively to the signal, unblocking the second version of the DU from executing real-time processing threads so that the second version of the DU is operated to process the data traffic using real-time processing threads executing on the processor. Block 1040 includes using the update agent to set the processing threads of the first version of the DU to non-real-time.

Figure 11:
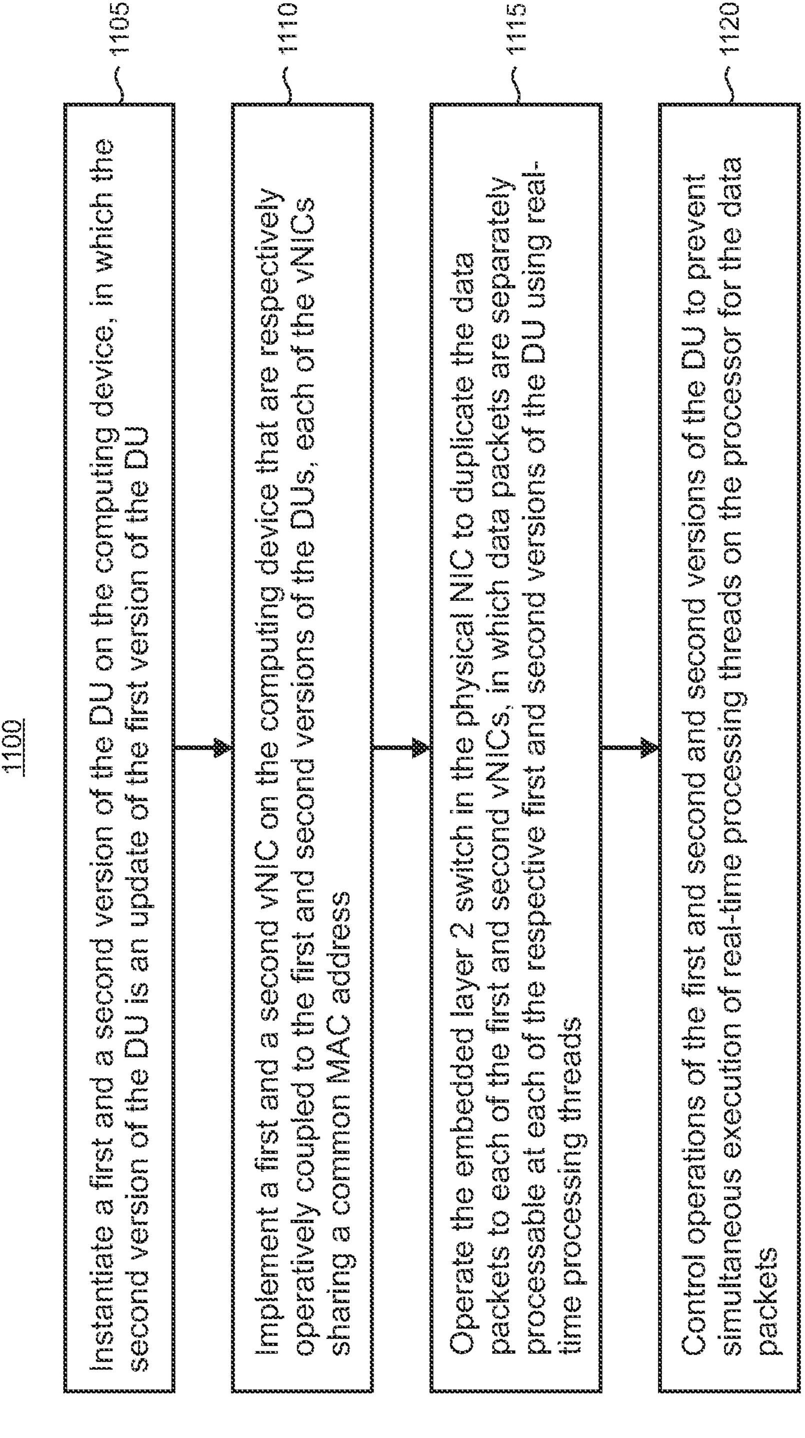

FIG. 11 shows an illustrative method 1100 performable by a computing device such as a server. Block 1105 includes instantiating a first and a second version of the DU on the computing device, in which the second version of the DU is an update of the first version of the DU. Block 1110 includes implementing a first and a second vNIC on the computing device that are respectively operatively coupled to the first and second versions of the DU, each of the vNICs sharing a common MAC address.

Block 1115 includes operating the embedded layer 2 switch in the physical NIC to duplicate the data packets to each of the first and second vNICs, in which data packets are separately processable at each of the respective first and second versions of the DU using real-time processing threads. Block 1120 includes controlling operations of the first and second versions of the DU to prevent simultaneous execution of real-time processing threads on the processor for the data packets.

Figure 12:
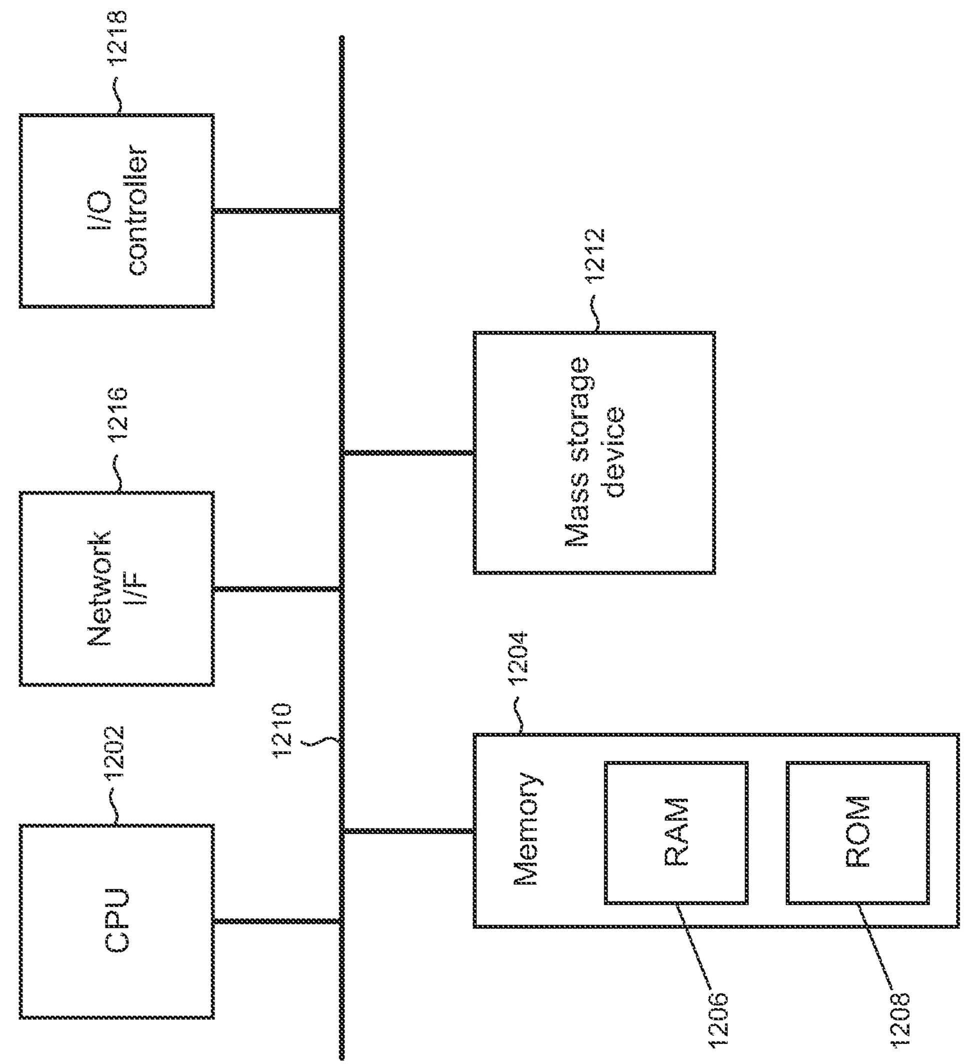
FIG. 12 is a block diagram of an illustrative server or computing device that may be used at least in part to implement the present 5G DU updating.

FIG. 12 shows an illustrative architecture 1200 for a computing device, such as a server, capable of executing the various components described herein for the present DU updating. The architecture 1200 illustrated in FIG. 12 includes one or more processors 1202 (e.g., central processing unit, dedicated AI chip, graphics processing unit, etc.), a system memory 1204, including RAM (random access memory) 1206 and ROM (read only memory) 1208, and a system bus 1210 that operatively and functionally couples the components in the architecture 1200. A basic input/output system containing the basic routines that help to transfer information between elements within the architecture 1200, such as during startup, is typically stored in the ROM 1208. The architecture 1200 further includes a mass storage device 1212 for storing software code or other computer-executed code that is utilized to implement applications, the file system, and the OS. The mass storage device 1212 is connected to the processor 1202 through a mass storage controller (not shown) connected to the bus 1210. The mass storage device 1212 and its associated computer-readable storage media provide non-volatile storage for the architecture 1200. Although the description of computer-readable storage media contained herein refers to a mass storage device, such as a hard disk or CD-ROM drive, it may be appreciated by those skilled in the art that computer-readable storage media can be any available storage media that can be accessed by the architecture 1200.

By way of example, and not limitation, computer-readable storage media may include volatile and non-volatile, removable and non-removable media implemented in any method or technology for storage of information such as computer-readable instructions, data structures, program modules, or other data. For example, computer-readable media includes, but is not limited to, RAM, ROM, EPROM (erasable programmable read only memory), EEPROM (electrically erasable programmable read only memory), Flash memory or other solid state memory technology, CD-ROM, DVDs, HD-DVD (High Definition DVD), Blu-ray or other optical storage, magnetic cassettes, magnetic tape, magnetic disk storage or other magnetic storage devices, or any other medium which can be used to store the desired information and which can be accessed by the architecture 1200.

According to various embodiments, the architecture 1200 may operate in a networked environment using logical connections to remote computers through a network. The architecture 1200 may connect to the network through a network interface unit 1216 connected to the bus 1210. It may be appreciated that the network interface unit 1216 also may be utilized to connect to other types of networks and remote computer systems. The architecture 1200 also may include an input/output controller 1218 for receiving and processing input from a number of other devices, including a keyboard, mouse, touchpad, touchscreen, control devices such as buttons and switches or electronic stylus (not shown in FIG. 12). Similarly, the input/output controller 1218 may provide output to a display screen, user interface, a printer, or other type of output device (also not shown in FIG. 12).

It may be appreciated that the software components described herein may, when loaded into the processor 1202 and executed, transform the processor 1202 and the overall architecture 1200 from a general-purpose computing system into a special-purpose computing system customized to facilitate the functionality presented herein. The processor 1202 may be constructed from any number of transistors or other discrete circuit elements, which may individually or collectively assume any number of states. More specifically, the processor 1202 may operate as a finite-state machine, in response to executable instructions contained within the software modules disclosed herein. These computer-executable instructions may transform the processor 1202 by specifying how the processor 1202 transitions between states, thereby transforming the transistors or other discrete hardware elements constituting the processor 1202.

Encoding the software modules presented herein also may transform the physical structure of the computer-readable storage media presented herein. The specific transformation of physical structure may depend on various factors, in different implementations of this description. Examples of such factors may include, but are not limited to, the technology used to implement the computer-readable storage media, whether the computer-readable storage media is characterized as primary or secondary storage, and the like. For example, if the computer-readable storage media is implemented as semiconductor-based memory, the software disclosed herein may be encoded on the computer-readable storage media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable storage media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media to change the optical characteristics of those locations. Other transformations of physical media are possible without departing from the scope and spirit of the present description, with the foregoing examples provided only to facilitate this discussion.

In light of the above, it may be appreciated that many types of physical transformations take place in the architecture 1200 in order to store and execute the software components presented herein. It also may be appreciated that the architecture 1200 may include other types of computing devices, including wearable devices, handheld computers, embedded computer systems, smartphones, PDAs, and other types of computing devices known to those skilled in the art. It is also contemplated that the architecture 1200 may not include all of the components shown in FIG. 12, may include other components that are not explicitly shown in FIG. 12, or may utilize an architecture completely different from that shown in FIG. 12.

Figure 13:
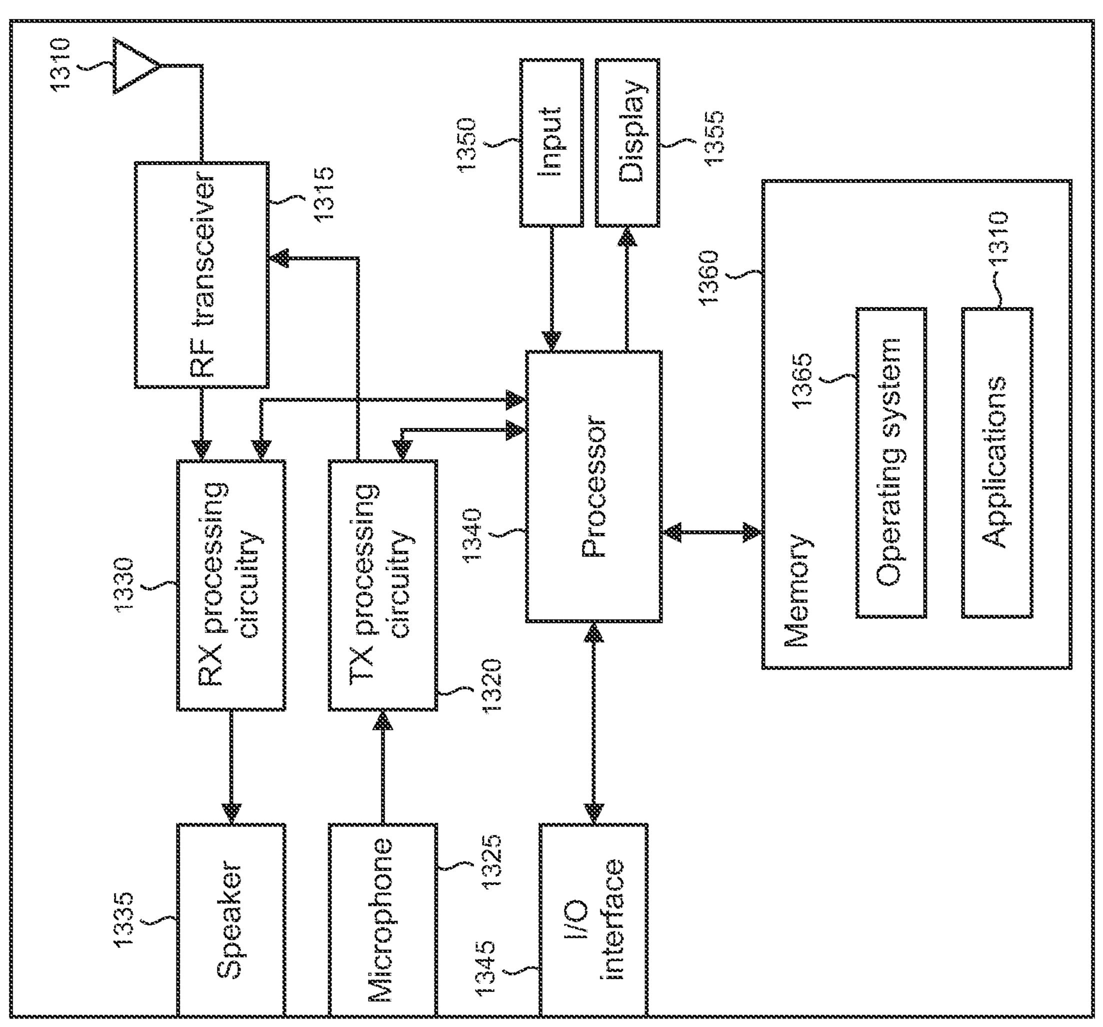
FIG. 13 is a block diagram of an illustrative UE that may be used at least in part to implement the present 5G DU updating.

FIG. 13 is a block diagram of an illustrative UE 105 that may be used at least in part to implement the present 5G DU updating. The embodiment of the UE 105 shown in FIG. 13 is for illustration only, and the UEs 105 shown in the drawings and described in the preceding text may have the same or similar configuration. However, it is noted that UEs may come in a wide variety of configurations, and FIG. 13 does not limit the scope of the present disclosure to any particular implementation of a UE.

The UE 105 includes an antenna 1310, a radio frequency (RF) transceiver 1315, transmit (TX) processing circuitry 1320, a microphone 1325, and receive (RX) processing circuitry 1330. The UE 105 also includes a speaker 1335, a processor 1340, an input/output (I/O) interface 1345, an input device 1350, a display 1355, and a memory 1360. The memory includes an operating system (OS) program 1365 and one or more applications 1310.

The RF transceiver 1315 receives from the antenna 1310, an incoming RF signal transmitted by a gNB of a 5G network 100 (FIG. 1). The RF transceiver down-converts the incoming RF signal to generate an intermediate frequency (IF) or baseband signal. The IF or baseband signal is sent to the RX processing circuitry 1330, which generates a processed baseband signal by filtering, decoding, and/or digitizing the baseband or IF signal. The RX processing circuitry transmits the processed baseband signal to the speaker 1335 (such as for voice data) or to the processor 1340 for further processing (such as for web browsing data).

The TX processing circuitry 1320 receives analog or digital voice data from the microphone 1325 or other outgoing baseband data (such as web data, e-mail, or interactive video game data) from the processor 1340. The TX processing circuitry 1320 encodes, multiplexes, and/or digitizes the outgoing baseband data to generate a processed baseband or IF signal. The RF transceiver 1315 receives the outgoing processed baseband or IF signal from the TX processing circuitry and up-converts the baseband or IF signal to an RF signal that is transmitted via the antenna.

The processor 1340 can include one or more processors or other processing devices and execute the OS program 1365 stored in the memory 1360 to control the overall operation of the UE 105. For example, the processor may control the reception of forward channel signals and the transmission of reverse channel signals by the RF transceiver 1315, the RX processing circuitry 1330, and the TX processing circuitry 1320 in accordance with well-known principles. In some embodiments, the processor 1340 includes at least one microprocessor or microcontroller.

The processor 1340 may be configured for executing other processes and programs resident in the memory 1360, such as operations for CSI measurement and reporting for systems described in embodiments of the present disclosure. The processor can move data into or out of the memory as required by an executing process. In some embodiments, the processor may be configured to execute the applications 1310 based on the OS program 1365 or in response to signals received from gNBs or an operator. The processor is also coupled to the I/O interface 1345, which provides the UE 105 with the ability to connect to other computing devices such as laptop computers and handheld computers. The I/O interface may thus function as a communication path between such accessories and the processor.

The processor 1340 is also coupled to the input device 1350 (e.g., keypad, touchscreen, buttons etc.) and the display 1355. A user of the UE 105 can typically employ the input device to enter data into the UE. For example, the display can be a liquid crystal display or other display capable of rendering text and/or graphics, video, etc., from web sites, applications and/or service providers.

The memory 1360 is coupled to the processor 1340. Part of the memory may include a random access memory (RAM), and another part of the memory may include a Flash memory or other read-only memory (ROM).

As described in more detail below, the UE 105 can perform signaling and calculation for channel state information (CSI) reporting. Although FIG. 13 shows one illustrative example of UE 105, it may be appreciated that various changes may be made to the drawing. For example, various components may be combined, further subdivided, or omitted, and additional components may be added according to particular needs. As a particular example, the processor 1340 may be divided into multiple processors, such as one or more central processing units (CPUs) and one or more graphics processing units (GPUs). Also, while FIG. 13 depicts the UE 105 as configured as a mobile device, such as a smartphone, UEs may be configured to operate as other types of portable or stationary devices.

Figure 14:
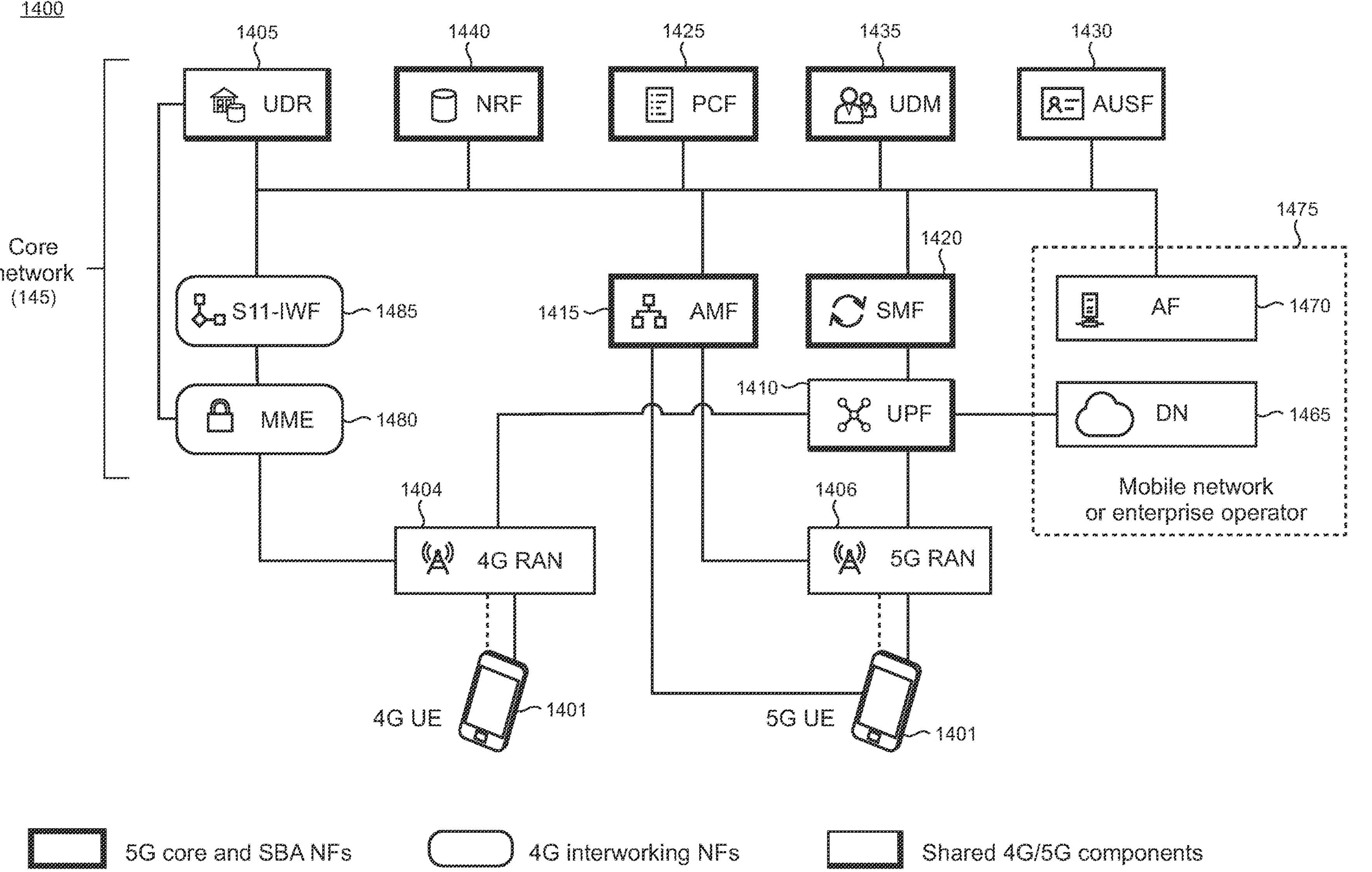
FIG. 14 shows details of an illustrative 4G/5G core network implemented using SDN (software-defined networking)

FIG. 14 shows an illustrative mobile network that uses a service-based architecture (SBA) 1400 as defined by the 3GPP (3rd Generation Partnership Project). An SBA provides a modular framework from which common applications can be deployed using components of varying sources and vendors. Control plane functionality and common data repositories of the network are delivered by way of a set of Network Functions (NFs) that are interconnected with a service-based interface bus, in which each has authorization to access each other's services. Assuming the role of either service consumer or service producer, NFs are self-contained, independent, and reusable. Each NF service exposes its functionality through a Service Based Interface (SBI), which employs a well-defined REST (Representational State Transfer) interface using HTTP/2 (Hypertext Transfer Protocol Version 2).

As shown, the mobile network includes a core network (CN) 145 that is interoperable with 4G (4th generation) and 5G (5th generation) radio access networks (RANs) 1404 and 1406 that support wireless communications with UE 1401. The CN architecture 1400 supports a 5G next generation core (NGC) network that includes 4G evolved packet core (EPC) instances to enable some 4G LTE (Long Term Evolution) use cases when implementing the present principles for updating a 5G DU. With 4G mode, some 5G components such as the UDR (unified data repository) 1405 and UPF (user plane function) 1410 support 4G mode without the need to revert to a legacy 4G stack. Other 4G components include an MME (mobility management entity) 1480 and IWF (interworking function) 1485.

The UPF handles user data, performing operations such as maintaining PDU (Protocol Data Unit) sessions, packet routing and forwarding, packet inspection, policy enforcement for the user plane, QoS (Quality of Service) handling, traffic usage reporting for billing, and the like. The UPF further provides an interconnection point between the mobile network infrastructure and an external data network (DN) 1465. The AF (application function) 1470 provides service or application related information to a VNF service consumer, for example, a mobile network or enterprise operator 1475.

The AMF (access and mobility management function) 1415 receives all connection and session related information from the UE 1401 but is only responsible for handling connection and mobility management tasks such as registration and authentication, identification, and mobility. All messages related to session management are forwarded over an interface to the Session Management Function (SMF) 1420 that establishes and manages sessions. It also selects and controls the UPF 1410 and handles paging. The AF 1470 provides service or application related information to the NF service consumer. For example, the AF performs operations such as retrieving resources and exposing services to end-users. Other 3GPP-defined 5G network functions in the architecture 1400 include SMF (session management function) 1420; PCF (policy control function) 1425; AUSF (authentication server function 1430; UDM (unified data management) 1435; and NRF (network repository function) 1440.

Figure 15:
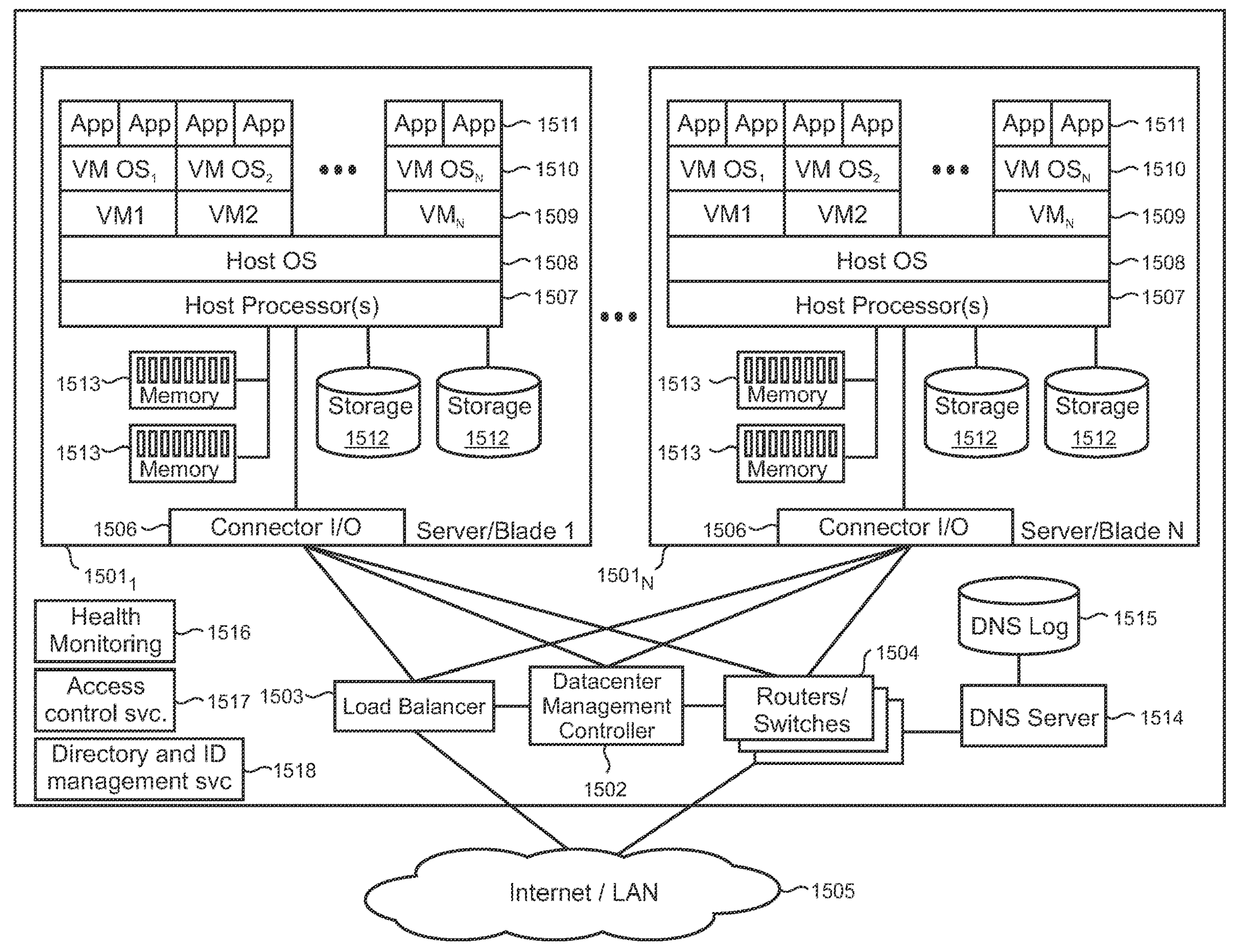
FIG. 15 is a block diagram of an illustrative datacenter that may be used at least in part to implement the present 5G DU updating.

FIG. 15 is a high-level block diagram of an illustrative datacenter 1500 that provides cloud computing services or distributed computing services that may be used to implement the present 5G DU updating. Datacenter 1500 may incorporate one or more of the features disclosed in the DCs shown in the drawings and described in the accompanying text. A plurality of servers 1501 are managed by datacenter management controller 1502. Load balancer 1503 distributes requests and computing workloads over servers 1501 to avoid a situation wherein a single server may become overwhelmed. Load balancer 1503 maximizes available capacity and performance of the resources in datacenter 1500. Routers/switches 1504 support data traffic between servers 1501 and between datacenter 1500 and external resources and users (not shown) via an external network 1505, which may be, for example, a local area network (LAN) or the Internet.

Servers 1501 may be standalone computing devices, and/or they may be configured as individual blades in a rack of one or more server devices. Servers 1501 have an input/output (I/O) connector 1506 that manages communication with other database entities. One or more host processors 1507 on each server 1501 run a host OS 1508 that supports multiple virtual machines (VM) 1509. Each VM 1509 may run its own OS so that each VM OS 1510 on a server is different, or the same, or a mix of both. The VM OSs 1510 may be, for example, different versions of the same OS (e.g., different VMs running different current and legacy versions of the Windows® operating system). In addition, or alternatively, the VM OSs 1510 may be provided by different manufacturers (e.g., some VMs running the Windows® operating system, while other VMs are running the Linux® operating system). Each VM 1509 may also run one or more applications (Apps) 1511. Each server 1501 also includes storage 1512 (e.g., hard disk drives (HDD)) and memory 1513 (e.g., RAM) that can be accessed and used by the host processors 1507 and VMs 1509 for storing software code, data, etc.

Datacenter 1500 provides pooled resources on which customers or tenants can dynamically provision and scale applications as needed without having to add servers or additional networking. This allows tenants to obtain the computing resources they need without having to procure, provision, and manage infrastructure on a per-application, ad-hoc basis. A cloud computing datacenter 1500 allows tenants to scale resources up or down dynamically to meet the current needs of their businesses. Additionally, a datacenter operator can provide usage-based services to tenants so that they pay for only the resources they use, when they need to use them. For example, a tenant may initially use one VM 1509 on server 15011 to run their applications 1511. When demand for an application 1511 increases, the datacenter 1500 may activate additional VMs 1509 on the same server 15011 and/or on a new server 1501N as needed. These additional VMs 1509 can be deactivated if demand for the application later drops.

Datacenter 1500 may offer guaranteed availability, disaster recovery, and back-up services. For example, the datacenter may designate one VM 1509 on server 15011 as the primary location for the tenant's application and may activate a second VM 1509 on the same or a different server as a standby or back-up in case the first VM or server 15011 fails. The datacenter management controller 1502 automatically shifts incoming user requests from the primary VM to the back-up VM without requiring tenant intervention. Although datacenter 1500 is illustrated as a single location, it will be understood that servers 1501 may be distributed to multiple locations across the globe to provide additional redundancy and disaster recovery capabilities. Additionally, datacenter 1500 may be an on-premises, private system that provides services to a single enterprise user or may be a publicly accessible, distributed system that provides services to multiple, unrelated customers and tenants or may be a combination of both.

Domain Name System (DNS) server 1514 resolves domain and host names into IP addresses for all roles, applications, and services in datacenter 1500. DNS log 1515 maintains a record of which domain names have been resolved by role. It will be understood that DNS is used herein as an example and that other name resolution services and domain name logging services may be used to identify dependencies, for example, in other embodiments, IP or packet sniffing, code instrumentation, or code tracing.

Datacenter health monitoring 1516 monitors the health of the physical systems, software, and environment in datacenter 1500. Health monitoring 1516 provides feedback to datacenter managers when problems are detected with servers, blades, processors, or applications in datacenter 1500, or when network bandwidth or communications issues arise.

Access control service 1517 determines whether users are allowed to access particular connections and services provided at the datacenter 1500. Directory and identity management service 1518 authenticates user credentials for tenants on datacenter 1500.

Various exemplary embodiments of the present updating a distributed unit in a 5G virtual radio access network are now presented by way of illustration and not as an exhaustive list of all embodiments. An example includes a computer-implemented method operating on a computer server for updating versions of a distributed unit (DU) in a virtual radio access network in a wireless 5G (fifth generation) network, comprising: operating a first version of the DU on the computer server to process data traffic, associated with user equipment (UE), received over a fronthaul of the 5G network from a radio unit (RU), in which the data traffic processing is performed by the first version of the DU by executing real-time processing threads on a processor of the computer server; initializing a second version of the DU on the computer server, the second version of the DU being updated from the first version, in which the initialization is performed by the second version of the DU by executing non-real-time processing threads on the processor; and implementing an update agent on the computer server, the update agent selectively setting processing threads of the first version of the DU to non-real-time processing and blocking creation of real-time processing threads by the second version of the DU to prevent simultaneous execution on the processor of real-time processing threads from the first and second versions of the DU.

In another example, the computer-implemented method further includes the second version of the DU completing initialization to thereby be enabled for data traffic processing using real-time processing threads that execute on the processor. In another example, the computer-implemented method further includes receiving a signal at the update agent that indicates that the second version of the DU has completed initialization. In another example, the signal is an implicit signal comprising a thread creation event occurring at the second version of the DU. In another example, blocking by the update agent of the second version of the DU from generating real-time processing threads comprises intercepting real-time thread creation events occurring at the second version of the DU. In another example, blocking by the update agent of the second version of the DU from generating real-time processing threads comprises intercepting real-time thread priority-changing events occurring at the second version of the DU. In another example, the computer-implemented method further includes operating the update agent to set the processing threads of the first version of the DU to non-real-time in response to the second version of the DU completing initialization. In another example, the computer-implemented method further includes unblocking the second version of the DU from generating real-time processing threads. In another example, the computer-implemented method further includes instantiating and dedicating a virtual network interface card (vNIC) to each of the first and second versions of the DU, each vNIC sharing a common MAC (medium access control) address. In another example, the computer-implemented method further includes using a layer 2 switch in the computer server to duplicate data traffic from the fronthaul to each of the instantiated vNICs to enable processing of the data traffic by the respective first and second versions of the DUs. In another example, each of the first and second versions of the DU use a respective dedicated vNIC for kernel-bypass-based data traffic processing. In another example, the computer-implemented method further includes implementing a process scheduler on the computer server giving priority to real-time processing threads over non-real-time processing threads.

A further example includes one or more hardware-based non-transitory computer-readable memory devices storing computer-executable instructions which, upon execution by one or more processors disposed in a computer server, cause the computer server to update versions of a distributed unit (DU) in a virtual radio access network (vRAN) in a 5G (fifth generation) network, the updating comprising: instantiating a process scheduler on the computer server, the process scheduler operating to give priority to real-time processing threads executing on a processor of the computer server over non-real-time processing threads executing on the processor; hosting a first version of a distributed unit (DU) on the computer server, the first version of the DU being coupled via fronthaul to a radio unit (RU) supporting data traffic to and from a population of user equipment (UE); operating the first version of the DU to process the data traffic using real-time processing threads; operating a second version of the DU to perform initialization processes using non-real-time processing threads, in which the second version of the DU is enabled to process data traffic upon completion of the initialization processes; instantiating an update agent on the computer server, the update agent being configured for blocking the second version of the DU from executing real-time processing threads on the processor; receiving a signal at the update agent from the second version of the DU indicating that the initialization processes are complete; responsively to the signal, unblocking the second version of the DU from executing real-time processing threads so that the second version of the DU is operated to process the data traffic using real-time processing threads executing on the processor; and using the update agent to set the processing threads of the first version of the DU to non-real-time.

In another example, the computer-executable instructions further cause the computer server to instantiate a first and second virtual network interface card (vNIC), each of the vNICs sharing a common MAC (medium access control) address. In another example, the computer-executable instructions further cause the computer server to provide duplicated data traffic to the first and second versions of the DUs via respective first and second vNICs.

A further example includes a computing device hosting a distributed unit (DU) operable in a virtual radio access network (vRAN) of a 5G (fifth generation) network, comprising: a physical network interface card (NIC) including an embedded layer 2 switch, the physical NIC operatively coupled to a fronthaul of the 5G network to process data packets associated with user equipment (UE) that is supported by the 5G network; a processor operatively coupled to the physical NIC; and memory storing computer-executable instructions which, upon execution by the processor, cause the computing device to: instantiate a first and a second version of the DU on the computing device, in which the second version of the DU is an update of the first version of the DU; implement a first and a second virtual NIC (vNIC) on the computing device that are respectively operatively coupled to the first and second versions of the DU, each of the vNICs sharing a common MAC (medium access control) address; operate the embedded layer 2 switch in the physical NIC to duplicate the data packets to each of the first and second vNICs, in which data packets are separately processable at each of the respective first and second versions of the DU using real-time processing threads; and control operations of the first and second versions of the DU to prevent simultaneous execution of real-time processing threads on the processor for the data packets.

In another example, the computing device is utilized in a distributed RAN (D-RAN) configuration. In another example, the computer-executable instructions further cause the computing device to configure the first and second versions of the DU to utilize kernel-bypass to process the data packets. In another example, the kernel-bypass comprises DPDK (data plane development kit). In another example, the computer-executable instructions further cause the computing device to instantiate an update agent configured to set processing threads to non-real-time, in which process scheduling on the computing device gives priority to real-time processing threads.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While some embodiments comprise/include the disclosed features and may therefore include additional features not specifically described, other embodiments may be essentially free of or completely free of non-disclosed elements—that is, non-disclosed elements may optionally be essentially omitted or completely omitted.

What is claimed:

1. A computer-implemented method operating on a computer server for updating versions of a distributed unit (DU) in a virtual radio access network in a wireless 5G (fifth generation) network, comprising:

operating a first version of the DU on the computer server to process data traffic, associated with user equipment (UE), received over a fronthaul of the 5G network from a radio unit (RU), in which the data traffic processing is performed by the first version of the DU by executing real-time processing threads on a processor of the computer server;

initializing a second version of the DU on the computer server, the second version of the DU being updated from the first version, in which the initialization is performed by the second version of the DU by executing non-real-time processing threads on the processor; and implementing an update agent on the computer server, the update agent selectively setting processing threads of the first version of the DU to non-real-time processing and blocking creation of real-time processing threads by the second version of the DU to prevent simultaneous execution on the processor of real-time processing threads from the first and second versions of the DU.

2. The computer-implemented method of claim 1 further including the second version of the DU completing initialization to thereby be enabled for data traffic processing using real-time processing threads that execute on the processor.

3. The computer-implemented method of claim 2 further including receiving a signal at the update agent that indicates that the second version of the DU has completed initialization.

4. The computer-implemented method of claim 3 in which the signal is an implicit signal comprising a thread creation event occurring at the second version of the DU.

5. The computer-implemented method of claim 4 in which blocking by the update agent of the second version of the DU from generating real-time processing threads comprises intercepting real-time thread creation events occurring at the second version of the DU.

6. The computer-implemented method of claim 4 in which blocking by the update agent of the second version of the DU from generating real-time processing threads comprises intercepting real-time thread priority-changing events occurring at the second version of the DU.

7. The computer-implemented method of claim 6 further including operating the update agent to set the processing threads of the first version of the DU to non-real-time in response to the second version of the DU completing initialization.

8. The computer-implemented method of claim 7 further including unblocking the second version of the DU from generating real-time processing threads.

9. The computer-implemented method of claim 1 further including instantiating and dedicating a virtual network interface card (vNIC) to each of the first and second versions of the DU, each vNIC sharing a common MAC (medium access control) address.

10. The computer-implemented method of claim 9 further including using a layer 2 switch in the computer server to duplicate data traffic from the fronthaul to each of the instantiated vNICs to enable processing of the data traffic by the respective first and second versions of the DUs.

11. The computer-implemented method of claim 10 in which each of the first and second versions of the DU use a respective dedicated vNIC for kernel-bypass-based data traffic processing.

12. The computer-implemented method of claim 1 further including implementing a process scheduler on the computer server giving priority to real-time processing threads over non-real-time processing threads.

13. One or more hardware-based non-transitory computer-readable memory devices storing computer-executable instructions which, upon execution by one or more processors disposed in a computer server, cause the computer server to update versions of a distributed unit (DU) in a virtual radio access network (vRAN) in a 5G (fifth generation) network, the updating comprising:

instantiating a process scheduler on the computer server, the process scheduler operating to give priority to real-time processing threads executing on a processor of the computer server over non-real-time processing threads executing on the processor;

hosting a first version of a distributed unit (DU) on the computer server, the first version of the DU being coupled via fronthaul to a radio unit (RU) supporting data traffic to and from a population of user equipment (UE);

operating the first version of the DU to process the data traffic using real-time processing threads;

operating a second version of the DU to perform initialization processes using non-real-time processing threads, in which the second version of the DU is enabled to process data traffic upon completion of the initialization processes;

instantiating an update agent on the computer server, the update agent being configured for blocking the second version of the DU from executing real-time processing threads on the processor;

receiving a signal at the update agent from the second version of the DU indicating that the initialization processes are complete;

responsively to the signal, unblocking the second version of the DU from executing real-time processing threads so that the second version of the DU is operated to process the data traffic using real-time processing threads executing on the processor; and using the update agent to set the processing threads of the first version of the DU to non-real-time.

14. The one or more hardware-based non-transitory computer-readable memory devices of claim 13 in which the computer-executable instructions further cause the computer server to instantiate a first and second virtual network interface card (vNIC), each of the vNICs sharing a common MAC (medium access control) address.

15. The one or more hardware-based non-transitory computer-readable memory devices of claim 14 in which the computer-executable instructions further cause the computer server to provide duplicated data traffic to the first and second versions of the DUs via respective first and second vNICs.

16. A computing device hosting a distributed unit (DU) operable in a virtual radio access network (vRAN) of a 5G (fifth generation) network, comprising:

a physical network interface card (NIC) including an embedded layer 2 switch, the physical NIC operatively coupled to a fronthaul of the 5G network to process data packets associated with user equipment (UE) that is supported by the 5G network;

a processor operatively coupled to the physical NIC; and memory storing computer-executable instructions which, upon execution by the processor, cause the computing device to:

instantiate a first and a second version of the DU on the computing device, in which the second version of the DU is an update of the first version of the DU;

implement a first and a second virtual NIC (vNIC) on the computing device that are respectively operatively coupled to the first and second versions of the DU, each of the vNICs sharing a common MAC (medium access control) address;

operate the embedded layer 2 switch in the physical NIC to duplicate the data packets to each of the first and second vNICs, in which data packets are separately processable at each of the respective first and second versions of the DU using real-time processing threads; and control operations of the first and second versions of the DU to prevent simultaneous execution of real-time processing threads on the processor for the data packets.

17. The computing device of claim 16 as utilized in a distributed RAN (D-RAN) configuration.

18. The computing device of claim 16 in which the computer-executable instructions further cause the computing device to configure the first and second versions of the DU to utilize kernel-bypass to process the data packets.

19. The computing device of claim 18 in which the kernel-bypass comprises DPDK (data plane development kit).

20. The computing device of claim 16 in which the computer-executable instructions further cause the computing device to instantiate an update agent configured to set processing threads to non-real-time, in which process scheduling on the computing device gives priority to real-time processing threads.

* * * * *